(12) United States Patent
Bickham et al.

(10) Patent No.: US 9,477,037 B1
(45) Date of Patent: Oct. 25, 2016

(54) OPTICAL FIBER FOR SILICON PHOTONICS

(71) Applicant: Corning Incorporated, Corning, NY (US)

(72) Inventors: Scott Robertson Bickham, Corning, NY (US); Dana Craig Bookbinder, Corning, NY (US); Ming-Jun Li, Horseheads, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/091,107

(22) Filed: Apr. 5, 2016

Related U.S. Application Data

(60) Provisional application No. 62/151,031, filed on Apr. 22, 2015.

(51) Int. Cl.
  *G02B 6/44* (2006.01)
  *G02B 6/036* (2006.01)
  *G02B 6/30* (2006.01)

(52) U.S. Cl.
  CPC ......... *G02B 6/0365* (2013.01); *G02B 6/03627* (2013.01); *G02B 6/03666* (2013.01); *G02B 6/30* (2013.01)

(58) Field of Classification Search
  None
  See application file for complete search history.

(56) References Cited

U.S. PATENT DOCUMENTS 8,724,937 B2  5/2014  Barwicz
2013/0136408 A1*  5/2013  Bookbinder ........... G02B 6/028
  385/124

OTHER PUBLICATIONS

Jonas Weiss, et al., "Optical Interconnects for Disaggregated Resources in Future Datacenters", ECOC 2014, Cannes—France, Tu.3.5.1, pp. 1-3.
Tymon Barwicz, et al., "Assembly of Mechanically Compliant Interfaces between Optical Fibers and Nanophotonic Chips", , Tymon Barwicz (IBM), et al., Electronic Components & Technology Conference, 2014, . 978-1-4799-2407-3, 2014 IEEE, pp. 179-185.

* cited by examiner

*Primary Examiner* — Ryan Lepisto
*Assistant Examiner* — Erin Chiem
(74) *Attorney, Agent, or Firm* — Kevin L. Bray

(57) ABSTRACT

An optical fiber for efficient coupling of optical signals to photonic devices. The glass optical fiber includes a core region, an optional inner cladding region, a depressed index region, and an outer cladding region. The relative refractive index profile of the fiber is designed to provide large effective area and low bending losses at wavelengths of interest for photonic devices. The photonic devices may be silicon photonic devices with an operating wavelength at or near 1310 nm.

22 Claims, 2 Drawing Sheets

OPTICAL FIBER FOR SILICON PHOTONICS

This application claims the benefit of priority under 35 U.S.C. §119 of U.S. Provisional Application Ser. No. 62/151,031 filed on Apr. 22, 2015 the content of which is relied upon and incorporated herein by reference in its entirety.

FIELD

This description pertains to optical fibers for applications in silicon photonics and integrated optical systems. More particularly, this description pertains to optical fibers designed for efficient coupling to waveguides used in silicon photonics packages. Most specifically, this description pertains to single mode optical fibers having large effective area and low bending losses.

BACKGROUND

The need for greater bandwidth and higher data transmission rates has motivated efforts to develop next-generation platforms for information storage and delivery. It is widely believed that optical information systems will provide superior performance to today's microelectronics-based systems. Integrated optical systems based on silicon photonics are a leading replacement technology for microelectronic systems. Silicon photonics interfaces with standard CMOS technologies and WDM (wavelength division multiplexing) to convert electrical signals to optical signals, to transmit optical signals, and to reconvert optical signals to electrical signals. In disaggregated systems, transfer of signals between units occurs through optical links that provide high bandwidth and high data transfer rates.

Deployment of silicon photonics has been limited by packaging. In order to operate efficiently, losses in the transfer of optical signals to and from silicon photonic devices need to be minimized. A proposed silicon photonics device includes a silicon chip (substrate) for receiving electrical signals and producing optical signals and an SOI (silicon-on-insulator) waveguide for coupling light from the chip to a polymer waveguide. The polymer waveguide includes a core and a cladding and transfers the optical signal to an optical link for delivery to other devices. Polymer waveguides are one preferred practical conduit for transferring light from the chip to an optical link because they offer ease of manufacturing and flexibility in design.

Efficient operation of silicon photonic devices requires low loss coupling of the optical signal from the silicon chip to the to the optical link. Success in minimizing coupling losses between the chip and polymer waveguide has been achieved through adiabatic coupling techniques. See, for example, I. M. Soganci et al., Opt. Express 21(13), 16075-16085 (2013). Although optical fibers have been used in conjunction with silicon photonic devices, insufficient progress has been made in tailoring the characteristics of optical fibers to minimize coupling losses. There is a need for new optical fibers with performance characteristics suitable for use in silicon photonics assemblies.

SUMMARY

The present description provides an optical fiber designed for integration with silicon photonic devices. The fiber features high coupling efficiency with silicon photonic devices. The refractive index profile of the fiber is designed to maximize the efficiency of signal transfer between the fiber and silicon photonic device. The refractive index profile of the fiber is further designed to minimize bending losses in the fiber to provide greater flexibility in deployment without compromising performance.

The optical fiber includes a core region, an optional inner cladding region, a depressed index cladding region, and an outer cladding region.

The present disclosure extends to:
An optical fiber comprising:
  a core region, said core region having an outer radius $r_1$ in the range from 4 to 8 microns and a relative refractive index $\Delta_{1max}$ in the range from 0.12% to 0.33%;
  a depressed index cladding region surrounding said core region, said depressed index cladding region having a relative refractive index $\Delta_3$ less than −0.25%, and a trench volume of at least 25% $\Delta$-micron$^2$; and
  an outer cladding region surrounding said depressed index cladding region, said outer cladding region having an outer radius $r_4$;
  wherein said optical fiber has a mode field diameter (MFD) at 1310 nm ≥10.0 microns, a cable cutoff wavelength ≤1260 nm, and a bending loss at 1310 nm, as determined by the mandrel wrap test using a mandrel having a diameter of 15 mm, of ≤0.45 dB/turn.

The present disclosure extends to:
An optical fiber comprising:
  a core region, said core region having an outer radius $r_1$ in the range from 4 to 8 microns and a relative refractive index $\Delta_{1max}$ in the range from 0.12% to 0.33%;
  a depressed index cladding region surrounding said core region, said depressed index cladding region having a relative refractive index $\Delta_3$ less than −0.25%, and a trench volume of at least 25% $\Delta$-micron$^2$; and an outer cladding region surrounding said depressed index cladding region, said outer cladding region having an outer radius $r_4$;
  wherein said optical fiber has a mode field diameter (MFD) at 1310 nm ≥10.0 microns, a cable cutoff wavelength ≤1260 nm, and a bending loss at 1310 nm, as determined by the mandrel wrap test using a mandrel having a diameter of 15 mm, of ≤0.1 dB/turn.

The present disclosure extends to:
An integrated system comprising a photonic device optically coupled to an optical fiber, said optical fiber having:
  a core region, said core region having an outer radius $r_1$ in the range from 2 microns to 8 microns and a relative refractive index $\Delta_1$ in the range from 0.10% to 0.50%;
  a depressed index cladding region surrounding said core region, said depressed index cladding region having an outer radius $r_3$ in the range from 10 to 25 microns, a relative refractive index $\Delta_3$ less than −0.25%, and a trench volume of at least 40% $\Delta$-microns$^2$; and
  an outer cladding region surrounding said depressed index cladding region, said outer cladding region having an outer radius $r_4$ of at least 55 microns and a relative refractive index $\Delta_4$ in the range from −0.10% to 0.20%;
  wherein said optical fiber has an effective area at 1310 nm of at least 75 micron$^2$ and bending losses at 1310 nm, as determined by the mandrel wrap test using a mandrel having a diameter of 15 mm, of less than 0.45 dB/turn.

The present disclosure extends to:
An integrated system comprising a photonic device optically coupled to an optical fiber, said optical fiber having:

a core region, said core region having an outer radius $r_1$ in the range from 2 microns to 8 microns and a relative refractive index $\Delta_1$ in the range from 0.10% to 0.50%;

a depressed index cladding region surrounding said core region, said depressed index cladding region having an outer radius $r_3$ in the range from 10 to 25 microns, a relative refractive index $\Delta_3$ less than −0.25%, and a trench volume of at least 40% Δ-microns$^2$; and an outer cladding region surrounding said depressed index cladding region, said outer cladding region having an outer radius $r_4$ of at least 55 microns and a relative refractive index $\Delta_4$ in the range from −0.10% to 0.20%;

wherein said optical fiber has an effective area at 1310 nm of at least 75 micron$^2$ and bending losses at 1310 nm, as determined by the mandrel wrap test using a mandrel having a diameter of 15 mm, of less than 0.10 dB/turn.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present description, and together with the specification serve to explain principles and operation of methods, products, and compositions embraced by the present description. Features shown in the drawing are illustrative of selected embodiments of the present description and are not necessarily depicted in proper scale.

BRIEF DESCRIPTION OF THE DRAWINGS

While the specification concludes with claims particularly pointing out and distinctly claiming the subject matter of the written description, it is believed that the specification will be better understood from the following written description when taken in conjunction with the accompanying drawings, wherein:

The embodiments set forth in the drawings are illustrative in nature and not intended to be limiting of the scope of the detailed description or claims. Whenever possible, the same reference numeral will be used throughout the drawings to refer to the same or like feature.

DETAILED DESCRIPTION

Figure 1:
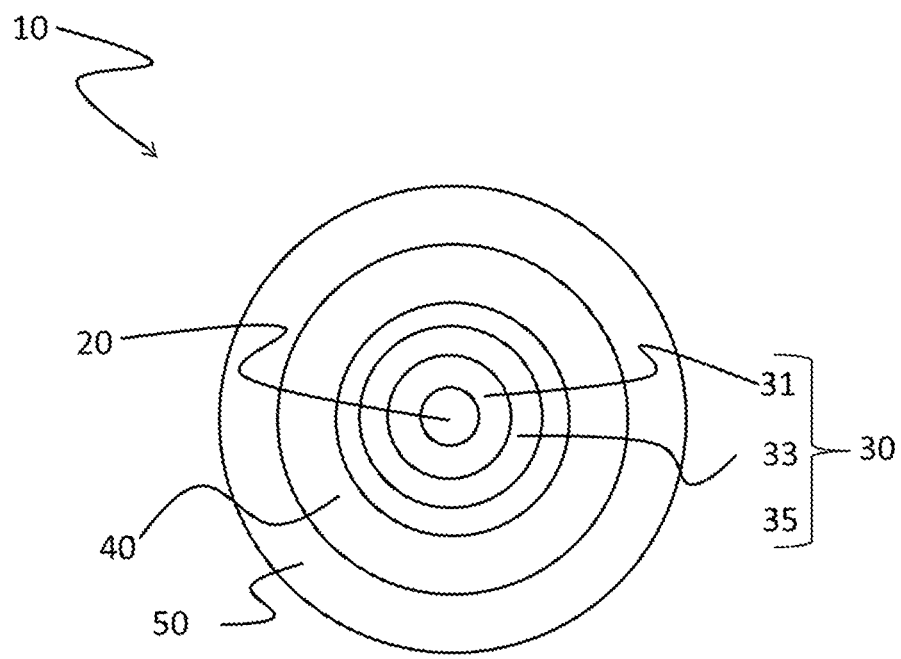
FIG. 1 is a schematic depiction in cross-section of a fiber having a core, an inner cladding region, a depressed index cladding region, an outer cladding region, a primary coating and a secondary coating.

Reference will now be made in detail to illustrative embodiments of the present description.

The present description provides optical fibers for applications in silicon photonics and other integrated optical systems. The fibers are suitable for coupling optical signals to silicon photonic devices, including devices coupled to the fiber via polymer waveguides. The refractive index profile of the fiber is designed to improve coupling efficiency to insure minimal losses in the transfer of optical signals between the fiber and a polymer waveguide. Of particular interest is coupling efficiency for optical signals having a wavelength at or near 1310 nm. Most effort in silicon photonics has emphasized optical signals with wavelengths in the 1.5 μm spectral region because of the wide availability of lasers and LEDs that operate in this spectral region. Dispersion losses in optical fibers, however, are less in the 1.3 μm spectral region than in the 1.5 μm spectral region and increasing attention is being directed at silicon photonic devices and systems that operate in the 1.3 μm spectral region. There is accordingly a need to design fibers customized for integration with silicon photonic systems that operate in the 1.3 μm spectral region.

The fibers disclosed herein are well suited for efficient coupling to silicon photonic devices that generate or transfer optical signals at or near 1310 nm. The fibers feature large effective area and low bending losses and provide high coupling efficiency to silicon photonic devices. The characteristics of the fiber, in particular, permit efficient transfer of optical signals to or from polymer waveguides.

An explanation of selected terms as used herein is now provided:

Selected measurements reported herein may be expressed in units of microns or square microns. The unit "microns" may also be expressed as "μm" or "micron". Similarly, the unit "micron squared" may also be expressed as "μm$^2$", "micron" or "microns".

"Radial position" or the radial coordinate "r" refers to radial position relative to the centerline (r=0) of the fiber.

The "refractive index profile" is the relationship between refractive index or relative refractive index and fiber radius. For relative refractive index profiles depicted herein as having step boundaries between adjacent core and/or cladding regions, normal variations in processing conditions may preclude obtaining sharp step boundaries at the interface of adjacent regions. It is to be understood that although boundaries of refractive index profiles may be depicted herein as step changes in refractive index, the boundaries in practice may be rounded or otherwise deviate from perfect step function characteristics. It is further understood that the value of the relative refractive index may vary with radial position within the core region and/or any of the cladding regions. When relative refractive index varies with radial position in a particular region of the fiber (core region and/or any of the cladding regions), it may be expressed in terms of its actual or approximate functional dependence or in terms of an average value applicable to the region. Unless otherwise specified, if the relative refractive index of a region (core region and/or any of the cladding regions) is expressed as a single value, it is understood that the relative refractive index in the region is constant, or approximately constant, and corresponds to the single value or that the single value represents an average value of a non-constant relative refractive index dependence with radial position in the region. Whether by design or a consequence of normal manufacturing variability, the dependence of relative refractive index on radial position may be sloped, curved, or otherwise non-constant.

"Relative refractive index," as used herein, is defined in Eq. 1 as:

$$\Delta_i\% = 100\frac{(n_i^2 - n_{ref}^2)}{2n_i^2}$$ Eq. 1 where $n_i$ is the maximum refractive index in region i, unless otherwise specified, and $n_{ref}$ is the refractive index of pure silica glass, unless otherwise specified. Accordingly, as used herein, the relative refractive index percent is relative to pure silica glass. As used herein, the relative refractive index is represented by $\Delta$ (or "delta") or $\Delta\%$ (or "delta %") and its values are given in units of "%", unless otherwise specified. Relative refractive index may also be expressed as $\Delta(r)$ or $\Delta(r)$ %.

The average relative refractive index ($\Delta_{ave}$) of a region of the fiber is determined from Eq. 2:

$$\Delta_{ave} = \int_{r_{inner}}^{r_{outer}} \frac{\Delta(r)dr}{(r_{outer} - r_{inner})}$$ Eq. 2 where $r_{inner}$ is the inner radius of the region, $r_{outer}$ is the outer radius of the region, and $\Delta(r)$ is the relative refractive index of the region.

The term "α-profile" refers to a relative refractive index profile $\Delta(r)$ that has the following functional form Eq. 3:

$$\Delta(r) = \Delta(r_0)\left[1 - \left[\frac{|r-r_0|}{(r_1-r_0)}\right]^\alpha\right]$$ Eq. 3 where $r_o$ is the point at which $\Delta(r)$ is maximum, $r_1$ is the point at which $\Delta(r)$ is zero, and r is in the range $r_1 \leq r \leq r_f$, where $r_1$ is the initial point of the α-profile, $r_f$ is the final point of the α-profile, and α is a real number. $\Delta(r_0)$ for an α-profile may be referred to herein as $\Delta_{max}$ or, when referring to a specific region i of the fiber, as $\Delta_{i,max}$.

"Effective area" of an optical fiber is defined in Eq. 4 as:

$$A_{eff} = \frac{2\pi\left[\int_0^\infty (f(r))^2 r dr\right]^2}{\int_0^\infty (f(r))^4 r dr}$$ Eq. 4 where f(r) is the transverse component of the electric field of the guided optical signal and r is radial position in the fiber. "Effective area" or "$A_{eff}$" depends on the wavelength of the optical signal and is reported herein for wavelengths of 1310 nm and 1550 nm. Specific indication of the wavelength will be made when referring to "Effective area" or "$A_{eff}$" herein.

The "mode field diameter" or "MFD" of an optical fiber is defined in Eq. 5 as:

$$MFD = 2w$$

$$w^2 = 2\frac{\int_0^\infty (f(r))^2 r dr}{\int_0^\infty \left(\frac{df(r)}{dr}\right)^2 r dr}$$ Eq. 5 where f(r) is the transverse component of the electric field distribution of the guided optical signal and r is radial position in the fiber. "Mode field diameter" or "MFD" depends on the wavelength of the optical signal and is reported herein for wavelengths of 1310 nm and 1550 nm. Specific indication of the wavelength will be made when referring to "Effective area" or "$A_{eff}$" herein.

"Trench volume" is defined in Eq. 6 as:

$$V_{Trench} = |2\int_{r_{Trench,inner}}^{r_{Trench,outer}} \Delta_{Trench}(r) r dr|$$ Eq. 6 where $r_{Trench,inner}$ is the inner radius of the trench region of the refractive index profile, $r_{Trench,outer}$ is the outer radius of the trench region of the refractive index profile, $\Delta_{Trench}(r)$ is the relative refractive index of the trench region of the refractive index profile, and r is radial position in the fiber. Trench volume is a positive quantity and will be expressed herein in units of % $\Delta$ $\mu m^2$, which may also be expressed as % $\Delta$-$m^2$, or % $\Delta$micron$^2$, or % $\Delta$-micron$^2$.

"Chromatic dispersion", herein referred to as "dispersion" unless otherwise noted, of an optical fiber is the sum of the material dispersion, the waveguide dispersion, and the inter-modal dispersion. In the case of single mode waveguide fibers, the inter-modal dispersion is zero. Dispersion values in a two-mode regime assume intermodal dispersion is zero. The zero dispersion wavelength ($\lambda_0$) is the wavelength at which the dispersion has a value of zero. Dispersion slope is the rate of change of dispersion with respect to wavelength.

The cutoff wavelength of an optical fiber is the minimum wavelength at which the optical fiber will support only one propagating mode. For wavelengths below the cutoff wavelength, multimode transmission may occur and an additional source of dispersion may arise to limit the fiber's information carrying capacity. Cutoff wavelength will be reported herein as a fiber cutoff wavelength or a cable cutoff wavelength. The fiber cutoff wavelength is based on a 2-meter fiber length and the cable cutoff wavelength is based on a 22-meter cabled fiber length. The 22-meter cable cutoff wavelength is typically less than the 2-meter cutoff wavelength due to higher levels of bending and mechanical pressure in the cable environment.

The bend resistance of an optical fiber may be gauged by bend-induced attenuation under prescribed test conditions. Various tests are used in the art to assess bending losses in fibers. For purposes of the present disclosure, bending losses are determined by a mandrel wrap test. In the mandrel wrap test, the fiber is wrapped around a mandrel having a specified diameter and the increase in attenuation due to the bending (relative to a straight fiber) at a particular wavelength is determined. Attenuation in the mandrel wrap test is expressed in units of dB/turn, where one turn refers to one revolution of the fiber about the mandrel.

The present fibers include a core region and a cladding region surrounding the core region. The fibers may also include a primary coating surrounding the cladding region, and a secondary coating surrounding the primary coating. The cladding region may include an inner cladding region and an outer cladding region. The cladding may further include a depressed index cladding region. The depressed index cladding region is a cladding region having a lower relative refractive index than adjacent inner and/or outer cladding regions. The depressed index cladding region may also be referred to herein as a trench or trench region. The depressed index cladding region may surround the inner cladding region and/or may be surrounded by the outer cladding region. The refractive index profile of the core region may be designed to minimize attenuation losses while maintaining a large mode field diameter for the fiber. The primary and secondary coatings may be selected to protect the mechanical integrity of the core and cladding and to minimize the effects of external mechanical disturbances on the characteristics of the optical signal guided in the fiber. The primary and secondary coatings may insure that losses due to bending and other perturbing forces are minimized. The depressed index cladding region may also contribute to a reduction in bending losses.

Whenever used herein, radius $r_1$ and relative refractive index $\Delta_1(r)$ refer to the core region, radius $r_2$ and relative refractive index $\Delta_2(r)$ refer to the inner cladding region, radius $r_3$ and relative refractive index $\Delta_3(r)$ refer to the depressed index cladding region, and radius $r_4$ and relative refractive index $\Delta_4(r)$ refer to the outer cladding region. It is understood that the central core region is substantially cylindrical in shape and that the surrounding inner cladding, depressed index cladding, and outer cladding regions are substantially annular in shape. Annular regions may be characterized in terms of an inner radius and an outer radius. Radial positions $r_1$, $r_2$, $r_3$ and $r_4$ refer herein to the outermost radii of the central core region, inner cladding region, depressed index cladding region, outer cladding region, respectively. When two regions are directly adjacent to each other, the outer radius of the inner of the two regions coincides with the inner radius of the outer of the two regions. In one embodiment, for example, the fiber includes a depressed index cladding region surrounded by and directly adjacent to an outer cladding region. In such an embodiment, the radius $r_3$ corresponds to the outer radius of the depressed index cladding region and the inner radius of the outer cladding region.

As will be described further hereinbelow, the relative refractive indices of the central core region, inner cladding region, depressed index cladding region, and outer cladding region may differ. Each of the regions may be formed from silica glass or a silica-based glass. Variations in refractive index may be accomplished by incorporating updopants or downdopants at levels known to provide a targeted refractive index or refractive index profile using techniques known to those of skill in the art. Updopants are dopants that increase the refractive index of the glass relative to the undoped glass composition. Downdopants are dopants that decrease the refractive index of the glass relative to the undoped glass composition. In one embodiment, the undoped glass is pure silica glass. When the undoped glass is pure silica glass, updopants include Cl, Br, Ge, Al, P, Ti, Zr, Nb, and Ta, and downdopants include F and B. Regions of constant refractive index may be formed by not doping or by doping at a uniform concentration. Regions of variable refractive index may be formed through non-uniform spatial distributions of dopants.

Figure 2:
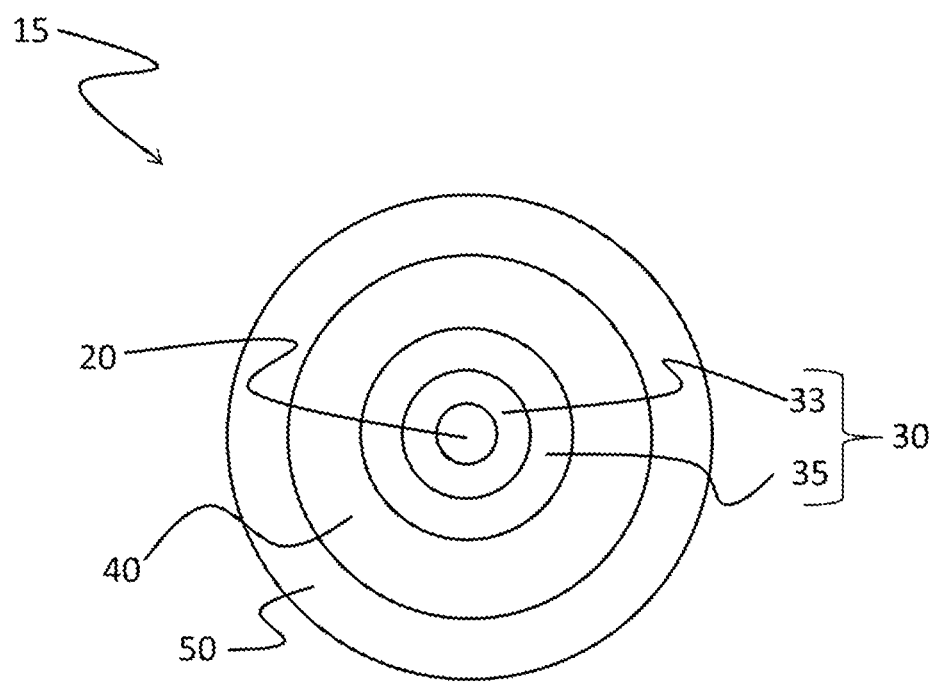
FIG. 2 is a schematic depiction in cross-section of a fiber having a core, a depressed index cladding region, an outer cladding region, a primary coating and a secondary coating.

A schematic cross-sectional depiction of a first of many coated fibers in accordance with the present disclosure is shown in FIG. 1. Fiber 10 includes core region 20, cladding region 30, primary coating 40, and secondary coating 50. Cladding region 30 includes inner cladding region 31, depressed index cladding region 33, and outer cladding region 35. Inner cladding region 31 is optional and may be omitted as shown for fiber 15 in FIG. 2.

Figure 3:
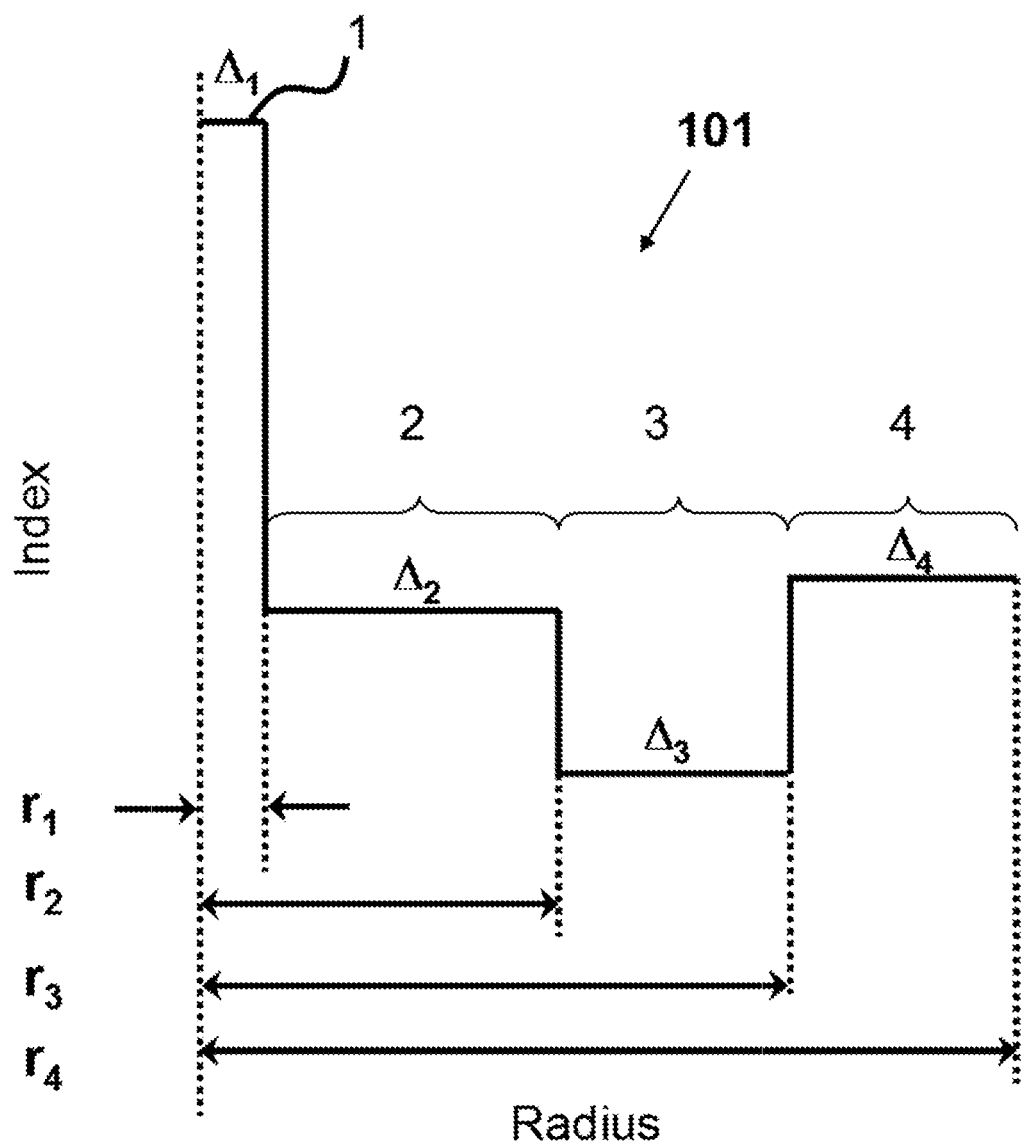
FIG. 3 depicts an illustrative refractive index profile of the glass portion of an optical fiber.

A representative refractive index profile for the glass portion (core and cladding regions) of an optical fiber is presented in FIG. 3. FIG. 3 shows a rectangular trench profile for a fiber (101) having a core region (1) with outer radius $r_1$ and relative refractive index $\Delta_1$, an inner cladding region (2) extending from radial position $r_1$ to radial position $r_2$ and having relative refractive index $\Delta_2$, a depressed index cladding region (3) extending from radial position $r_2$ to radial position $r_3$ and having relative refractive index $\Delta_3$, and an outer cladding region (4) extending from radial position $r_3$ to radial position $r_4$ and having relative refractive index $\Delta_4$. In the profile of FIG. 3, the depressed index cladding region (3) may be referred to herein as a trench and may have a constant refractive index that is less than the refractive indices of the inner cladding region (2) and the outer cladding region (4). Core region (1) has the highest relative refractive index in the profile. Core region (1) may include a lower index region at or near the centerline (known in the art as a "centerline dip") (not shown). It should be noted that the inner cladding region (2) is optional and may be eliminated as noted hereinabove. When inner cladding region (2) is missing, depressed index region (3) is directly adjacent core region (1).

The relative ordering of relative refractive indices $\Delta_1$, $\Delta_2$, $\Delta_3$, and $\Delta_4$ satisfy the conditions $\Delta_1 > \Delta_4 > \Delta_3$ and $\Delta_1 > \Delta_2 > \Delta_3$. The values of $\Delta_2$ and $\Delta_4$ may be equal or either may be greater than the other, but both $\Delta_2$ and $\Delta_4$ are between $\Delta_1$ and $\Delta_3$.

The relative refractive index $\Delta_1$ of core region (1) may be in the range from 0.10% to 0.50%, or in the range from 0.12% to 0.33%, or in the range from 0.15% to 0.40%, or in the range from 0.20% to 0.35%, or in the range from 0.15% to 0.25%. The radius $r_1$ of central core region (1) may be in the range from 2 µm to 8 µm, or in the range from 4 µm to 8 µm, or in the range from 3 µm to 7 µm, or in the range from 4 µm to 6 µm.

The relative refractive index $\Delta_1$ of core region (1) may be described by an α-profile having an α value in the range from 2 to 100, or in the range from 3 to 75, or in the range from 4 to 50, or in the range from 5 to 35, or in the range from 6 to 25, or in the range from 2 to 4, or in the range from 8 to 15, or in the range from 10 to 14, or in the range from 11 to 13, or of about 10, or of about 12, or of about 14. In embodiments in which the relative refractive index $\Delta_1$ corresponds to an α-profile, the maximum value $\Delta_{1max}$ of $\Delta_1$ may be in the range from 0.10% to 0.50%, or in the range from 0.12% to 0.33%, or in the range from 0.15% to 0.40%, or in the range from 0.20% to 0.35%, or in the range from 0.15% to 0.25%.

The relative refractive index $\Delta_2$ of inner cladding region (2) may be in the range from −0.10% to 0.20%, or in the range from −0.05% to 0.10%, or in the range from −0.05% to 0.05%. The radius $r_2$ of inner cladding region (2) may be in the range from 5 µm to 20 µm, or in the range from 7 µm to 15 µm, or in the range from 8 µm to 12 µm.

The relative refractive index $\Delta_3$ of depressed index cladding region (3) may be less than −0.25% or less than −0.30%, or less than −0.35%, or less than −0.40%, or less than −0.45%, or less than −0.50%, or in the range from −0.50% to −0.20%, or in the range from −0.50% to −0.30%, or in the range from −0.45% to −0.30%. The radius $r_3$ of depressed index cladding region (3) may be in the range from 10 µm to 25 µm, or in the range from 15 µm to 25 µm, or in the range from 15 µm to 20 µm. The trench volume of depressed index cladding region (3) may be at least 25% Δ μm², or at least 40% Δ μm², or at least 60% Δ μm², or at least 80% Δ μm², or at least 100% Δ μm², or at least 120% Δ μm², or in the range from 40% Δ μm² to 150% Δ μm², or in the range from 60% Δ μm² to 140% Δ μm², in the range from 80% Δ μm² to 140% Δ μm².

The relative refractive index $\Delta_4$ of outer cladding region (4) may be in the range from −0.10% to 0.20%, or in the range from −0.05% to 0.10%, or in the range from −0.05% to 0.05%. The radius $r_4$ of outer cladding region (4) may be at least 50 μm, or at least 55 μm, or at least 60 μm, or in the range from 55 μm to 70 μm, or in the range from 60 μm to 65 μm, or about 62.5 μm.

Optical fibers with relative refractive index profiles as described herein feature high mode field diameters, large effective areas, short cutoff wavelengths, and low bending losses.

The mode field diameter of the fiber at a wavelength of 1310 nm may be at least 10.0 μm, or at least 10.5 μm, or at least 11.0 μm, or at least 11.4 μm, or in the range from 9.0 μm to 12.0 μm, or in the range from 10.0 μm to 12.0 μm. The mode field diameter of the fiber at a wavelength of 1550 nm may be 10.5 μm, or at least 11.0 μm, or at least 11.5 μm, or at least 12.0 μm or in the range from 9.5 μm to 12.5 μm, or in the range from 10.5 μm to 12.5 μm.

The effective area of the present fibers at a wavelength of 1310 nm may be at least 75 μm², or at least 80 μm², or at least 90 μm², or at least 100 μm², or at least 105 μm², or in the range from 60 μm² to 120 μm², or in the range from 70 μm² to 120 μm², or in the range from 80 μm² to 120 μm². The effective area of the present fibers at a wavelength of 1550 nm may be at least 75 μm², or at least 85 μm², or at least 95 μm², or at least 105 μm², or at least 115 μm², or in the range from 75 μm² to 130 μm², or in the range from 85 μm² to 130 μm², or in the range from 95 μm² to 130 μm².

The present fibers may have a cutoff wavelength (LP11 mode) of less than 1250 nm, or less than 1200 nm, or less than 1150 nm, or less than 1100 nm, or less than 1050 nm, or less than 1000 nm. The present fibers may have a cable cutoff wavelength (LP11 mode) of less than or equal to 1300 nm, or less than or equal to 1280 nm, or less than or equal to 1260 nm, or less than or equal to 1250 nm.

The bending loss of the present fibers at 1310 nm as determined by the mandrel wrap test using a mandrel having a diameter of 10 mm may be less than 1.5 dB/turn, or less than 1.0 dB/turn, or less than 0.50 dB/turn, or less than 0.30 dB/turn, or less than 0.20 dB/turn, or less than 0.10 dB/turn, or less than 0.05 dB/turn, or less than 0.02 dB/turn, or less than 0.01 dB/turn. The bending loss of the present fibers at 1310 nm as determined by the mandrel wrap test using a mandrel having a diameter of 15 mm may be less than 1.0 dB/turn, or less than 0.50 dB/turn, or less than 0.45 dB/turn, or less than 0.20 dB/turn, or less than 0.10 dB/turn, or less than 0.05 dB/turn, or less than 0.02 dB/turn, or less than 0.01 dB/turn, or less than 0.005 dB/turn. In some preferred embodiments, the bending loss at 1310 nm as determined by the mandrel wrap test using a mandrel having a diameter of 15 mm is less than 0.45 dB/turn. In some other preferred embodiments, the bending loss at 1310 nm as determined by the mandrel wrap test using a mandrel having a diameter of 15 mm is less than 0.1 dB/turn. The bending loss of the present fibers at 1310 nm as determined by the mandrel wrap test using a mandrel having a diameter of 20 mm may be less than 0.15 dB/turn, or less than 0.10 dB/turn, or less than 0.07 dB/turn, or less than 0.05 dB/turn, or less than 0.03 dB/turn, or less than 0.02 dB/turn, or less than 0.01 dB/turn, or less than 0.005 dB/turn. The bending loss of the present fibers at 1310 nm as determined by the mandrel wrap test using a mandrel having a diameter of 30 mm may be less than 0.10 dB/turn, or less than 0.05 dB/turn, or less than 0.03 dB/turn, or less than 0.02 dB/turn, or less than 0.01 dB/turn, or less than 0.007 dB/turn, or less than 0.005 dB/turn.

The core and cladding of the present coated fibers may be produced in a single-step operation or multi-step operation by methods which are well known in the art. Suitable methods include: the double crucible method, rod-in-tube procedures, and doped deposited silica processes, also commonly referred to as chemical vapor deposition ("CVD") or vapor phase oxidation. A variety of CVD processes are known and are suitable for producing the core and cladding layer used in the coated optical fibers of the present invention. They include external CVD processes, axial vapor deposition processes, modified CVD (MCVD), inside vapor deposition, and plasma-enhanced CVD (PECVD).

The glass portion of the coated fibers may be drawn from a specially prepared, cylindrical preform which has been locally and symmetrically heated to a temperature sufficient to soften the glass, e.g., a temperature of about 2000° C. for a silica glass. As the preform is heated, such as by feeding the preform into and through a furnace, a glass fiber is drawn from the molten material. See, for example, U.S. Pat. Nos. 7,565,820; 5,410,567; 7,832,675; and 6,027,062; the disclosures of which are hereby incorporated by reference herein, for further details about fiber making processes.

EXAMPLES

Exemplary fibers in accordance with the present description are now described and modeled to illustration one or more advantageous features disclosed herein.

The exemplary fibers have relative refractive index profiles of the type shown in FIG. 4 with modification of the relative refractive index of the core region to an α-profile. The fibers included a core region (1), an inner cladding region (2), a depressed index cladding region (3) and an outer cladding region (4). The relative refractive index $\Delta_1$ of core region (1) was an α-profile with $\alpha_1=12$ and maximum relative refractive index $\Delta_{1max}$. The base composition of the exemplary fibers was undoped silica glass (4=0). Regions with Δ>0 and Δ<0 were obtained by inclusion of updopants and downdopants, respectively. The radii and relative refractive indices of the different regions of the exemplary fibers are shown in Table 1 and Table 2. Table 1 and Table 2 also include the trench volume of the depressed index cladding region of each exemplary fiber. Units of each parameter are listed in Table 1. The notation "EX" signifies "Example" and provides a distinguishing reference to each exemplary fiber. Comp. EX 1 and Comp. EX 2 are comparative examples. The notation "na" refers to "not applicable" and signifies that each of Comparative Example 1 and Comparative Example 2 lacks a trench in the index profile.

TABLE 1

| Parameter | Comp. EX 1 | Comp. EX 2 | EX 1 | EX 2 | EX 3 |
|---|---|---|---|---|---|
| $\Delta_{1, max}$ (%) | 0.295 | 0.192 | 0.24 | 0.21 | 0.18 |
| $R_1$ (μm) | 5.3 | 6.55 | 4.7 | 4.9 | 5.05 |
| $\alpha_1$ | 12 | 12 | 12 | 12 | 12 |
| $\Delta_2$ (%) | na | na | 0.00 | 0.00 | 0.00 |
| $R_2$ (μm) | na | na | 9 | 9 | 9 |
| $\Delta_3$ (%) | na | na | −0.4 | −0.45 | −0.45 |
| $R_3$ (μm) | na | na | 18 | 18 | 19 |
| $\Delta_4$ (%) | 0 | 0 | 0.00 | 0.00 | 0.00 |
| $R_4$ (μm) | 62.5 | 62.5 | 62.5 | 62.5 | 62.5 |

TABLE 2

| Parameter | EX 4 | EX 5 | EX 6 | EX 7 | EX 8 | EX 9 |
|---|---|---|---|---|---|---|
| $\Delta_{1,\,max}$ (%) | 0.15 | 0.125 | 0.235 | 0.175 | 0.30 | 0.22 |
| $R_1$ (μm) | 5.5 | 6.85 | 5.8 | 6 | 5.15 | 6 |
| $\alpha_1$ | 12 | 12 | 12 | 12 | 2 | 2 |
| $\Delta_2$ (%) | 0.00 | 0 | 0 | 0 | 0 | 0 |
| $R_2$ (μm) | 9 | 9 | 12 | 6 | 12 | 12 |
| $\Delta_3$ (%) | −0.45 | −0.35 | −0.45 | −0.2 | −0.45 | −0.45 |
| $R_3$ (μm) | 19 | 17.6 | 21 | 18.3 | 21 | 21 |
| $\Delta_4$ (%) | 0.00 | 0 | 0 | 0 | 0 | 0 |
| $R_4$ (μm) | 62.5 | 62.5 | 62.5 | 62.5 | 62.5 | 62.5 |

Selected optical properties of the two comparative examples and each exemplary fiber were modeled and are listed in Table 3 and Table 4. The bend losses were modeled based on the mandrel wrap test and are reported in units of dB/turn, where the diameter of the mandrel used for the test is listed in Table 3 and Table 4. The examples outlined in Tables 1 and 2 show optical fibers having MFD at 1310 nm of larger than 10 microns, cable cutoff of less than 1260 nm and bend loss at 1310 nm for a mandrel diameter of 15 mm of less than 0.45 dB/turn.

TABLE 3

| Parameter | Comp. EX 1 | Comp. EX 2 | EX 1 | EX 2 | EX 3 |
|---|---|---|---|---|---|
| MFD at 1310 nm (μm) | 10.12 | 12.54 | 10.03 | 10.45 | 10.88 |
| MFD at 1550 nm (μm) | 11.38 | 14.09 | 11.09 | 11.43 | 11.84 |
| $A_{Eff}$ at 1310 nm (μm²) | 81.6 | 125.2 | 79.0 | 86.3 | 94.2 |
| $A_{Eff}$ at 1550 nm (μm²) | 99.9 | 153.3 | 95.5 | 102.8 | 111.0 |
| Dispersion at 1310 nm (ps/nm/km) | 1.39 | 2.13 | 1.979 | 2.68 | 3.17 |
| Dispersion at 1550 nm (ps/nm/km) | 18.51 | 19.67 | 20.54 | 21.33 | 21.82 |
| Dispersion Slope at 1310 nm (ps/nm²/km) | 0.0881 | 0.0896 | 0.0934 | 0.094 | 0.0942 |
| Dispersion Slope at 1550 nm (ps/nm²/km) | 0.0594 | 0.0612 | 0.0657 | 0.0658 | 0.0657 |
| Zero dispersion wavelength (nm) | 1294 | 1286 | 1289 | 1281 | 1276 |
| Bend loss at 1310 nm (dB/turn (10 mm diameter)) | 11.55 | 102.2 | 0.010 | 0.007 | 0.004 |
| Bend loss at 1310 nm (dB/turn (15 mm diameter)) | 1.22 | 48.4 | 0.002 | 0.002 | 0.002 |
| Bend loss at 1310 nm (dB/turn (20 mm diameter)) | 0.197 | 24.5 | 0.001 | 0.001 | 0.001 |
| Bend loss at 1310 nm (dB/turn (30 mm diameter)) | 0.00035 | 2.93 | 0.0002 | 0.0003 | 0.0005 |
| 22 m Cable Cutoff (nm) | 1258 | 1253 | 1251 | 1257 | 1255 |
| Trench Volume (% Δ-μm²) | na | na | −97 | −109 | −126 |

TABLE 4

| Parameter | EX 4 | EX 5 | EX 6 | EX 7 | EX 8 | EX 9 |
|---|---|---|---|---|---|---|
| MFD at 1310 nm (μm) | 11.44 | 12.41 | 11.23 | 10.09 | 10.08 | 11.54 |
| MFD at 1550 nm (μm) | 12.3 | 13.16 | 12.81 | 11.0 | 11.71 | 13.1 |
| AEff at 1310 nm (μm²) | 106 | 131.3 | 94.5 | 84.6 | 75.7 | 100 |
| AEff at 1550 nm (μm²) | 122 | 146.0 | 123.7 | 97.6 | 101.8 | 129.3 |
| Dispersion at 1310 nm (ps/nm/km) | 3.93 | 4.6 | 0.3 | 3.55 | −1.49 | 0.738 |
| Dispersion at 1550 nm (ps/nm/km) | 22.47 | 22.9 | 19.37 | 20.97 | 17.47 | 19.8 |
| Dispersion Slope at 1310 nm (ps/nm²/km) | 0.0939 | 0.0929 | 0.0949 | 0.0893 | 0.0935 | 0.0952 |
| Dispersion Slope at 1550 nm (ps/nm²/km) | 0.0652 | 0.0641 | 0.0682 | 0.0601 | 0.0687 | 0.068 |
| Zero dispersion wavelength (nm) | 1268 | 1260 | 1307 | 1270 | 1326 | 1302 |
| Bend loss at 1310 nm (dB/turn (10 mm diameter)) | 0.005 | 0.120 | 1.36 | 0.296 | 1.155 | 0.507 |
| Bend loss at 1310 nm (dB/turn (15 mm diameter)) | 0.002 | 0.051 | 0.02 | 0.10 | 0.409 | 0.113 |
| Bend loss at 1310 nm (dB/turn (20 mm diameter)) | 0.001 | 0.057 | 0.044 | 0.049 | 0.139 | 0.025 |
| Bend loss at 1310 nm (dB/turn (30 mm diameter)) | 0.0004 | 0.011 | 0.022 | 0.028 | 0.017 | 0.0012 |
| 22 m Cable Cutoff (nm) | 1249 | 1260 | 1249 | 1246 | 1252 | 1249 |
| Trench Volume (%Δ-μm²) | −126 | −80 | −134 | −60 | −134 | −134 |

In addition to optical fibers, the present disclosure extends to integrated systems that incorporate the fibers. In one embodiment, the integrated system includes a photonic device and the present fiber. The photonic device includes a microelectronic chip, a light source (e.g. semiconductor laser or LED), and a waveguide. In one embodiment, the light source operates at a wavelength at or near 1310 nm (e.g. in the range from 1250 nm to 1350 nm, or in the range from 1275 nm to 1325 nm, or in the range from 1290 nm to 1320 nm, or in the range from 1200 nm to 1400 nm). The photonic device may be coupled to an interface that includes a waveguide for exchanging optical signals between the photonic device and external elements of the integrated system. The photonic device may be an active device that receives an electrical signal, converts the electrical signal to an optical signal, directs the optical signal to the waveguide and delivers the optical signal through the waveguide to the interface or interfacing waveguide for delivery to external devices. Alternatively, the photonic device may be a passive device that receives and transfers an optical signal to an interface for delivery to external devices. The integrated system includes a fiber of the type disclosed herein. The fiber may be coupled directly to the photonic device or coupled to the photonic device through an interface or interfacing waveguide. The integrated system may also include peripheral devices such as modulators, detectors, multiplexers, demultiplexers, etc.

In one embodiment, the photonic device is a silicon photonic device. The silicon photonic device may include a silicon chip and a silicon-on-insulator waveguide optically coupled to the silicon chip. The silicon photonic device may also include a light source. The light source may be a silicon-based light source. The silicon-on-insulator waveguide may be optically coupled to an interface. The interface may include an interfacing waveguide and may permit transfer of optical signals to or from external devices and the silicon chip or a silicon-on-insulator waveguide. The interfacing waveguide may be a thin film waveguide or a planar waveguide. The interfacing waveguide may be a polymer waveguide. The optical fiber may be coupled to the interfacing waveguide and preferably has an effective area and mode field diameter that permits exchange of optical signals with the interfacing waveguide with minimal losses. The relative refractive index characteristics of the present fibers are designed to enable efficient exchange of optical signals with interfacing waveguides, including planar waveguides and polymer waveguides. The large mode field diameters provided by the present optical fibers reduce coupling losses between the optical fibers and integrated optical systems or silicon photonics chip assemblies. For example, coupling losses of standard G.652 single mode optical fibers with silicon photonics chip assemblies can be greater than 2 dB. Coupling losses between the present optical fibers and silicon photonics chip assemblies, in contrast, can be less than 1.5 dB, or less than 1.0 dB, or less than 0.5 dB.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the illustrated embodiments. Since modifications, combinations, sub-combinations and variations of the disclosed embodiments that incorporate the spirit and substance of the illustrated embodiments may occur to persons skilled in the art, the description should be construed to include everything within the scope of the appended claims and their equivalents.

What is claimed is:

1. An optical fiber comprising:
   a core region, said core region having an outer radius $r_1$ in the range from 4 to 8 microns and a relative refractive index $\Delta_{1max}$ in the range from 0.12% to 0.33%;
   a depressed index cladding region surrounding said core region, said depressed index cladding region having a relative refractive index $\Delta_3$ less than −0.25%, and a trench volume of at least 25% $\Delta$-micron$^2$; and
   an outer cladding region surrounding said depressed index cladding region, said outer cladding region having an outer radius $r_4$;
   wherein said optical fiber has a mode field diameter (MFD) at 1310 nm≥10.0 microns, a cable cutoff wavelength ≤1260 nm, and a bending loss at 1310 nm, as determined by the mandrel wrap test using a mandrel having a diameter of 15 mm, of ≤0.45 dB/turn.

2. The optical fiber of claim 1, wherein said outer radius $r_1$ is in the range from 4 to 7 microns and said relative refractive index $\Delta_1$ is in the range from 0.15% to 0.40%.

3. The optical fiber of claim 2, wherein said outer radius $r_3$ is in the range from 15 to 25 microns, said relative refractive index $\Delta_3$ is less than −0.35%, and said trench volume is at least 80% $\Delta$ $\mu m^2$.

4. The optical fiber of claim 3, wherein said outer radius $r_4$ is at least 60 microns and said relative refractive index $\Delta_4$ is in the range from −0.05% to 0.10%.

5. The optical fiber of claim 4, wherein said optical fiber has an effective area at 1310 nm of at least 75 micron$^2$ and said bending losses are less than 0.1 dB/turn.

6. The optical fiber of claim 5, wherein said outer radius $r_1$ is in the range from 4 to 6 microns and said relative refractive index $\Delta_1$ is in the range from 0.15% to 0.25%.

7. The optical fiber of claim 1, wherein said optical fiber has an effective area at 1310 nm of at least 90 micron$^2$ and said bending losses are less than 0.1 dB/turn.

8. The optical fiber of claim 1, further comprising:
   an inner cladding region surrounding said core region, said inner cladding region having an outer radius $r_2$ in the range from 5 to 20 microns and a relative refractive index $\Delta_2$ in the range from −0.10% to 0.20%, said depressed cladding index region surrounding said inner cladding region.

9. The optical fiber of claim 8, wherein said inner cladding region has an outer radius $r_2$ in the range from 7 to 15 microns and a relative refractive index $\Delta_2$ in the range from −0.05% to 0.10%.

10. The optical fiber of claim 9, wherein said outer radius $r_1$ is in the range from 4 to 7 microns and said relative refractive index $\Delta_1$ is in the range from 0.15% to 0.40%.

11. The optical fiber of claim 10, wherein said outer radius $r_3$ is in the range from 15 to 25 microns, said relative refractive index $\Delta_3$ is less than −0.35%, and said trench volume is at least 80% $\Delta$-micron$^2$.

12. The optical fiber of claim 11, wherein said outer radius $r_4$ is at least 60 microns and said relative refractive index $\Delta_4$ is in the range from −0.05% to 0.10%.

13. The optical fiber of claim 12, wherein said optical fiber has an effective area at 1310 nm of at least 75 micron$^2$ and bending losses at 1310 nm of less than 0.1 dB/turn on a 15 mm diameter mandrel.

14. The optical fiber of claim 13, wherein said outer radius $r_1$ is in the range from 4 to 6 microns and said relative refractive index $\Delta_1$ is in the range from 0.15% to 0.25%.

15. An integrated system comprising a silicon photonic device optically coupled to an optical fiber, said optical fiber having:
   a core region, said core region having an outer radius $r_1$ in the range from 2 to 8 microns and a relative refractive index $\Delta_1$ in the range from 0.10% to 0.50%;
   a depressed index cladding region surrounding said core region, said depressed index cladding region having an outer radius $r_3$ in the range from 10 to 25 microns, a relative refractive index $\Delta_3$ less than −0.25%, and a trench volume of at least 40% $\Delta$-micron$^2$; and
   an outer cladding region surrounding said depressed index cladding region, said outer cladding region having an outer radius $r_4$ of at least 55 microns and a relative refractive index $\Delta_4$ in the range from −0.10% to 0.20%;
   wherein said optical fiber has an effective area at 1310 nm of at least 75 micron$^2$ and bending losses at 1310 nm, as determined by the mandrel wrap test using a mandrel having a diameter of 15 mm, of less than 0.45 dB/turn.

16. The integrated system of claim 15, wherein said silicon photonic device includes a silicon-on-insulator waveguide, said optical fiber optically coupling to said silicon-on-insulator waveguide.

17. The integrated system of claim 15, further comprising an interface between said silicon photonic device and said optical fiber, said optical fiber optically coupling to said interface, said interface optically coupling to said silicon photonic device.

18. The integrated system of claim 17, wherein said silicon photonic device includes a silicon-on-insulator waveguide, said interface optically coupling to said silicon photonic device through said silicon-on-insulator waveguide.

19. The integrated system of claim 17, wherein said interface comprise an interfacing waveguide, said optical fiber coupling to said interface through said interfacing waveguide.

20. The integrated system of claim 19, wherein said interfacing waveguide is a planar waveguide.

21. The integrated system of claim 19, wherein said interfacing waveguide is a polymer waveguide.

22. The integrated system of claim 15, further comprising a light source, said light source producing an optical signal having a wavelength in the range from 1200 nm to 1400 nm, said optical signal propagating from said silicon photonic device to said optical fiber.

\* \* \* \* \*